United States Patent [19]

Harder

[11] Patent Number: 4,779,375

[45] Date of Patent: Oct. 25, 1988

[54] APPARATUS AND METHOD FOR TRAINING A PLANT TO GROW UPRIGHT USING A PLANT TRAINING STAKE

[76] Inventor: George H. Harder, 658 Canterbury Rd., San Marino, Calif. 91108

[21] Appl. No.: 132,482

[22] Filed: Dec. 14, 1987

[51] Int. Cl.⁴ .............................................. A01G 17/06
[52] U.S. Cl. ................................................................ 47/47
[58] Field of Search ............................................ 47/47

[56] References Cited

FOREIGN PATENT DOCUMENTS 994096  6/1965  United Kingdom .
2027323  2/1980  United Kingdom ................... 47/47

Primary Examiner—Charles T. Jordan
Assistant Examiner—Richard W. Wendtland
Attorney, Agent, or Firm—Lyon & Lyon

[57] ABSTRACT

Described herein is an apparatus for a plant training stake and a method for training a plant to grow upright using said plant training stake. A tension means attached at one end to a weight and the other end to a plant maintains a uniform tension automatically adjusting for the growth of the plant by causing downward movement of the weight in a member inserted into planting media.

26 Claims, 1 Drawing Sheet

4,779,375

APPARATUS AND METHOD FOR TRAINING A PLANT TO GROW UPRIGHT USING A PLANT TRAINING STAKE

FIELD OF THE INVENTION

This invention relates to an apparatus for a plant training stake and a method for training a plant to grow upright using said plant training stake.

BACKGROUND OF THE INVENTION

It is common to use planting stakes in the planting and care of plants. It should be understood that the term "plants" as used herein may include trees, shrubs, perennials, annuals, vines, edible crops, ornamentals, and the like. Stakes hold a plant upright and carry its leaves and flowers up into the sunlight, helping the plant prosper. Sunlight acts on green chlorophyll in leaves to digest raw materials from soil and air (photosynthesis).

Certain plants traditionally requiring staking include tomato vines, roses, and many varieties of orchids. In these plants, the stems are too long and thin to be held erect even by the woody tissue of the stem.

In addition, the use of stakes generally on other plants can be advantageous to deal with a variety of conditions or problems that may be encountered by the farmer or gardener. Stakes provide support for the plant against winds, watering and heavy snow. They keep plants from sprawling on the ground and disturbing adjacent plants which can be a problem where space is limited. Stakes further ensure that a plant when fully grown, will have a strong, straight stem or trunk. For example, in the case of exhibition chrysanthemums, a strong, straight stem to support the prize-winning bloom is highly desired.

There have been three alternatives in staking: brush staking, wire loops on wire support, and one or several garden stakes with ties. For brush staking, twiggy brush is assembled so that there is a finger-size main stick with plenty of twiggy branches growing from it, broom fashion. The plant is ringed with a dozen or more of the brushy sticks, butts pushed firmly into the soil. See for example, Good Housekeeping, Basic Gardening Techniques (1974), 157. Brush staking can compound a space problem and requires great effort in gathering, assembling, and using the brush as a stake.

Disadvantages are also associated with the use of wire loops on wire supports and clean stakes with ties. Weekly visits are required to add more ties and to check existing ties to ensure that the ties do not become too tight as the plant grows causing "girdling". "Girdling" refers to the choking of a branch by a wire, rope, or other inflexible material. It occurs most often in woody plants that have been too tightly tied to a stake or support. As the tied limb increases in girth, the tie fails to expand in diameter and cuts off supplies of nutrients and water to the part of the plant above the tie. If girdling goes unnoticed, the part of the plant above the constriction will die. See, Sunset Magazine, New Western Gardening Book, 1979, p. 508. Other drawbacks of the wire loops and clean stake alternatives have been recognized. When cutting off twigs or pruning the plants, the ties are generally required to be released from the stakes and this is time-consuming and complicated. Also, much like brush staking, the stakes form a "stick field" which is undesirable for aesthetic reasons. See, British Patent No. 944,096 published June 2, 1965. Moreover, the clean stakes are typically made from bamboo and redwood which may not withstand strong winds and can be easily broken.

It is also known that plants can be tied up with the aid of twine, string, cord or wire which is secured at one end to the plant and extends vertically upwardly from the plant to be secured at its other end to a support secured horizontally above the plant. This vertical support system, the purpose of which is to hold the plant upright, loses its function because it hangs progressively loose as the plant grows. British Patent No. 994,096, supra, describes a device to keep the vertical support permanently taut irrespective of the growth of the plant. A pivotally arranged winding-up drum for the wire or string and a resilient member rotating the winding-up drum in one direction is described. This device disadvantageously requires an overhead trellis or other horizontal support system on which to hang the device detracting from available space and aesthetics. Its internal spring system is subject to high breakage and the further the line is pulled out, the greater the tension. Further, many plants that require tying-up may still need a stake.

The present invention provides an apparatus for a plant training stake and a method of using same to train a plant to grow upright which avoids the disadvantages of the prior art by furnishing a self-contained durable plant training stake that occupies only a small amount of space, that requires little or no maintenance or monitoring, and that by maintaining a uniform constant tension, the support automatically compensates for the growth of the plant and remains permanently taut which keeps the plant upright.

SUMMARY OF THE INVENTION

According to the present invention and exemplary embodiment thereof described herein, a plant training stake is provided. A tension means is releasably secured at one end around a portion of the plant. The other end is nonreleasably secured to a weight. The weight end is slidably received by the guide means associated with a rigid upright elongated member which is insertable into planting media adjacent the plant.

The preferred embodiment of the apparatus according to the present invention comprises an upright rigid hollow tube with an open upper end and with its lower end pointed for insertion into planting media, such as soil. The tube is inserted adjacent the rooted end of the plant. "Adjacent" can be defined as any distance which does not bend the plant. The weight at one end of the tension means is slidably received by the hollow tube and is moveable within the tube. The other end of the tension means, which issues from the open upper end of the tube is releasably secured onto a portion of the plant by a hook or tag. As the plant grows, the tension means automatically adjusts for the growth of the plant by the weight moving downwardly in the tube and maintaining a constant uniform tension.

BRIEF DESCRIPTION OF THE DRAWINGS

The objects and features of the present invention will become better understood after the following description taken in conjunction with the drawing in which.

DETAILED DESCRIPTION OF THE INVENTION

Figure 1:
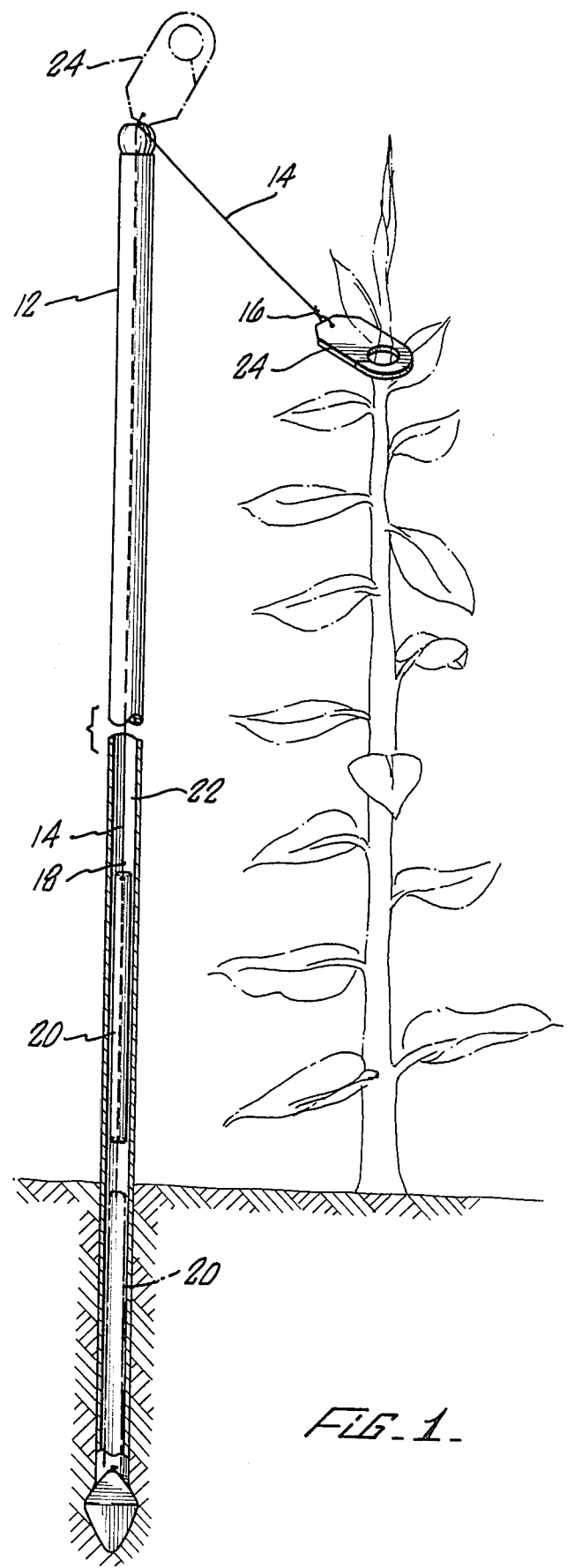
FIG. 1 shows a partial cross-section view of the apparatus with the upper half in elevation and the manner in which the apparatus according to the invention is used.

According to the present invention and exemplary embodiment thereof described herein, a plant training stake is provided. Referring to the drawing, a tension means 14 is releasably fastened at one end 16 around a portion of the plant. The other end 18 is nonreleasably secured to a weight 20. The tension means can be any resilent connecting means with a high tensile strength, such as fishing line. It may also include chains, wires, rods, ropes and the like. The weight end is slidably received by a guide means 22 associated with the rigid upright elongated member 12. The elongated member is insertable into planting media. The weight is moveable (phantom) in the guide means automatically adjusting for the growth of the plant keeping it upright. The elongated member chosen must be at all times taller than the plant. Growth of the plant may thus necessitate replacement of the elongated member with one that is taller.

The end of the tension means adapted to be releasably fastened to the plant can take the form of a hook or tag 24 (phantom). Several such attachment means can be used in the instance of a multi-stalk plant and they can be color-coded to differentiate between, for example, different types of crops or flowers.

The size of the weight depends on the type of plant to be staked. A thin plant will of course require a lesser amount of weight than a heavy plant. The size of the elongated member (length and diameter) is also variable depending on the plant. A suitable weight, for example, for use with some orchids is about one to about eight ounces. It is understood that by changing the length and diameter of the elongated member of the apparatus that any size or shape weight can be accommodated. The size of weight to be chosen should be such that the plant is not bent with use of the stake. Furthermore, in the case of multi-stalk plants or even several plants in close proximity, one elongated member with a number of lines comprising the tension means and a number of weights commensurate with the number of stalks or plants, respectively, can be used. Preferably, the elongated member may be a hollow tube, the internal passageway itself serving as the guide means allowing the weight to be moveable within the tube. Alternatively, the elongated member can be, for example, a flat plank with an external track serving as the guide means for the weight. A requirement for the guide means is that it be smooth and uninterrupted to allow for unimpeded movement of the weight therein.

In the present invention, a restraining means may be associated with the elongated member's upper end to prevent the weight from being pulled out of the upright elongated member. Such restraining means may be any suitable means through which the tension means can pass but will not allow the weight to pass. One such restraining means is a machined lip extending inward around the edge surface of the upper end of the elongated member (not shown). Another restraining means in the case of a tube serving as the elongated member is a bored stop that is wedged into the tube's upper end. Either of the above-mentioned restraining means may further serve the purpose of separating the tension means from a burred end thus preventing the tension means from being severed. Severing of the tension means can also be prevented by burnishing the member's upper end.

The aforesaid apparatus may be comprised of any materials compatible with the environment of use. It is preferably made from materials resistant to deterioration caused by wind, water, sun, and/or oxidation. Materials such as aluminum, plastic, steel and copper have been found suitable for the elongated member. Steel, lead, and copper weights have been found acceptable.

Although the invention has been shown in connection with a certain specific embodiment, it will be readily apparent to those skilled in the art that various changes in form and arrangement of parts may be made without departing from the spirit and scope of the invention.

What is claimed:

1. A plant training stake comprising:
   a. an upright rigid elongated member with an upper end and with a lower end adapted to be inserted into planting media adjacent the plant;
   b. a guide means associated with said elongated member; and
   c. tension means with two ends one of which is adapted to be releasably secured to the plant and the other of which is adapted to be secured by a weight within said guide means, said tension means being adapted to keep the secured portion of the plant upright by remaining taut due to movement of the weight in the guide means which automatically adjusts for the growth of the plant.

2. A plant training stake according to claim 1 wherein said upright elongated member is a hollow tube.

3. A plant training stake according to claim 1 wherein said end of the tension means adapted to be releasably secured to the plant issues from the upper end of the upright elongated member.

4. A plant training stake according to claim 1 wherein a restraining means is associated with said member's upper end to maintain said weighted end of said tension means within said guide means.

5. A plant training stake acording to claim 1 wherein said guide means is a track.

6. A plant training stake according to claim 2 wherein said guide means is the tube's internal passageway.

7. A plant training stake according to claim 1 wherein said tension means comprises a resilient line with high tensile strength.

8. A plant training stake according to claim 7 wherein said resilient line is fishing line.

9. A plant training stake according to claim 1 wherein said plant securing means are hooks.

10. A plant training stake according to claim 1 wherein said plant securing means are tags.

11. A plant training stake according to claim 1 wherein said tension means end is adapted to be releasably secured to the plant by affixing a hook to the end of the tension means.

12. A plant training stake according to claim 1 wherein said tension means end is adapted to be releasably secured to the plant by affixing a tag to the end of the tension means.

13. A plant training stake according to claim 1 wherein said lower end of said elongated member is pointed.

14. A plant training stake according to claim 4 wherein said restraining means is any suitable means through which the tension means can pass but not the weighted end thereof.

15. A plant training stake according to claims 4 or 14 wherein said restraining means is an inwardly extending lip at said upper end of said elongated member.

16. A plant training stake according to claims 4 or 14 wherein said restraining means is a bored stop that is wedged into said upper end of said elongated number.

17. A plant training stake according to claim 4 wherein said restraining means further prevents severance of the tension means.

18. A plant training stake according to claim 1 wherein said tension is adjusted by varying the amount of weight.

19. A plant training stake according to claim 1 wherein said tension means comprises multiple strands weighted at one end thereof.

20. A plant training stake comprising:
a. An upright rigid hollow tube with an upper open end and means on the lower end adapted to be secured at the rooted end of the plant;
b. tension means comprising at least one resilient line with one end adapted to be releasably fastened to the plant and passing through a restraining means to a weighted other end of said line slidably received within said tube and guided thereby, said restraining means adapted to maintain said weighted end within said tube and associated with said tube's upper open end; and
c. said end of the tension means adapted to be releasably fastened to the plant being adapted to issue from the upper end of said upright hollow tube.

21. A plant training stake according to claim 20 wherein said tension is adjusted by varying the amount of weight at said weighted end of said resilient line.

22. A plant training stake according to claim 20 wherein said tension means automatically adjusts for the growth of the plant.

23. A plant training stake according to claim 20 wherein said tension means maintains a uniform tension.

24. A plant training stake according to claim 20 wherein said tension means remains taut due to movement of the weighted end of said resilient line within said tube.

25. A plant training stake comprising:
an upright elongated rigid hollow housing adapted at one end to be insertable into planting media adjacent the plant and adapted at the other end to slidably receive a weight, said weight attached to one end of a tension means which has been attached at the other end to the top of the plant and by said tension means caused to automatically move downward by growth of the plant.

26. A method for training a plant to grow upright comprising attaching a weight to one end of a tension means, the other end of the tension means releasably attached to the top of the plant, said tension means maintaining a uniform tension automatically adjusting for growth of the plant by causing downward movement of the weight in an upright rigid elongated member which has two ends, one end of which is adapted for insertion into planting media and the other end for slidable receipt of said weight.

* * * * *